(12) United States Patent
Miyashiro et al.

(10) Patent No.: US 8,592,090 B2
(45) Date of Patent: Nov. 26, 2013

(54) SOLID POLYMER ELECTROLYTE BATTERY AND METHOD FOR MANUFACTURING POSITIVE ELECTRODE SHEET USED THEREIN

(75) Inventors: Hajime Miyashiro, Komae (JP); Yo Kobayashi, Komae (JP); Shiro Seki, Komae (JP); Toru Iwahori, Komae (JP)

(73) Assignee: Central Research Institute of Electric Power Industry, Tokyo (JP)

( * ) Notice: Subject to any disclaimer, the term of this patent is extended or adjusted under 35 U.S.C. 154(b) by 1101 days.

(21) Appl. No.: 11/659,658

(22) PCT Filed: May 18, 2005

(86) PCT No.: PCT/JP2005/009074
§ 371 (c)(1),
(2), (4) Date: Feb. 7, 2007

(87) PCT Pub. No.: WO2006/018921
PCT Pub. Date: Feb. 23, 2006

(65) Prior Publication Data
US 2008/0020283 A1    Jan. 24, 2008

(30) Foreign Application Priority Data
Aug. 18, 2004 (JP) ................................ 2004-238022

(51) Int. Cl.
*H01M 4/04* (2006.01)
*H01M 4/13* (2010.01)
*H01M 4/62* (2006.01)
*H01M 6/18* (2006.01)

(52) U.S. Cl.
USPC ........ 429/322; 429/218.1; 429/232; 29/623.5

(58) Field of Classification Search
USPC ................. 429/322, 304, 324, 325, 212, 326, 429/218.1, 232; 29/623.5, 623.1
See application file for complete search history.

(56) References Cited

U.S. PATENT DOCUMENTS

| | | | | |
|---|---|---|---|---|
| 5,009,970 A | * | 4/1991 | Kronfli et al. | 429/317 |
| 5,928,812 A | * | 7/1999 | Xue | 429/304 |

(Continued)

FOREIGN PATENT DOCUMENTS

| | | |
|---|---|---|
| JP | 9-82360 | 3/1997 |
| JP | 2001-210360 A | 8/2001 |

(Continued)

OTHER PUBLICATIONS

Machine Translation of JP 2003-373643 A, Dec. 2002, Nagura et al.*

(Continued)

*Primary Examiner* — Kenneth Douyette
(74) *Attorney, Agent, or Firm* — Edwards Wildman Palmer LLP; James E. Armstrong, IV; Nicholas J. DiCeglie, Jr.

(57) ABSTRACT

An organic electrolyte battery (10) including positive electrode material (2) and negative electrode material (4) and, interposed therebetween, organic electrolyte (6), wherein positive electrode active material particles (8) as a constituent of the positive electrode have surfaces at least partially coated with attachment (12) with electronic conductance and ionic conductance not easily oxidized even when supplied with oxygen from the positive electrode active material. The above attachment (12) is composed of microparticles of inorganic solid electrolyte with ionic conductance (14) and microparticles of conductive material with electronic conductance (16).

12 Claims, 8 Drawing Sheets

(56) References Cited

U.S. PATENT DOCUMENTS

| | | | |
|---|---|---|---|
| 6,337,155 B1 | 1/2002 | Takei et al. | |
| 6,451,487 B1 | 9/2002 | Besner et al. | |
| 6,645,675 B1* | 11/2003 | Munshi | 429/305 |
| 2002/0048706 A1 | 4/2002 | Mayes et al. | |
| 2003/0143465 A1* | 7/2003 | Takahashi et al. | 429/231.95 |
| 2005/0277027 A1* | 12/2005 | Kim et al. | 429/326 |

FOREIGN PATENT DOCUMENTS

| | | |
|---|---|---|
| JP | 2002-373643 | 12/2002 |
| JP | 2003-173770 | 6/2003 |
| JP | 2003-338321 | 11/2003 |

OTHER PUBLICATIONS

"3D Network Polymer Blend Gel Electrolyte consist of PEO-LiX Complex and PS", T. Momma et al., C1—Battery and Energy Technology Joint General Session, 203rd Meeting—Paris France, Apr. 27-May 2, 2003.*

"Electrochemical Uses of Carbon", Kim Kinoshita, Electochemistry Encyclopedia, Lawrence Berkeley National Laboratory, Jan. 2001. Retrieved online on Feb. 8, 2012 from: http://electrochem.cwru.edu/encycl/art-c01-carbon.htm.*

International Search Report including English translation of Opinion.

Canadian Office Action dated Jun. 12, 2009 for CA Application No. 2,574,304.

Supplementary European Search Report dated May 27, 2009 for EP Application No. 05741490.6.

First Office Action dated Jun. 12, 2009, issued for the Canadian Patent Application No. 2,574,304.

Second Office Action dated Apr. 27, 2010, issued for the Canadian Patent Application No. 2,574,304.

* cited by examiner

SOLID POLYMER ELECTROLYTE BATTERY AND METHOD FOR MANUFACTURING POSITIVE ELECTRODE SHEET USED THEREIN

TECHNICAL FIELD

The present invention relates to a solid polymer electrolyte battery in which a solid polymer electrolyte is interposed between a positive electrode material and a negative electrode material, and to a method for manufacturing a positive electrode sheet used in the organic electrolyte battery. The present invention more specifically relates to a solid polymer electrolyte battery that attains improved cycle characteristics or storage characteristics and high energy density, and to a method for manufacturing a positive electrode sheet used therein.

BACKGROUND ART

There is a need for high reliability with respect to failure and fire, an increased number of possible charge and discharge cycles (increased service life), and longer usage time (higher energy density) from a single charging in secondary batteries that are used for energy storage or for powering mobile devices. The plateau of the voltage per unit battery is the highest during discharge, being 4.1 V in the conventional organic electrolyte battery, and increasing the voltage per unit battery is effective for further increasing the energy density.

The method described below has been proposed for further increasing the discharge voltage. Specifically, a positive electrode material has been synthesized from a material that exhibits a voltage plateau of 4.7 V or higher during charge and discharge, wherein the material is composed of a compound of a positive electrode active material having a so-called spinel-type crystal form (e.g., $LiMxMn_{(2-x)}O_4$, wherein Ni, Co, Fe, or the like is used as the metal M, and the composition ratio x is equal to 0.5). The reason for these effects in the voltage plateau is considered to be that a high voltage is produced by a change in the valence of the metal M ions to another valence brought about by the state of the metal M ions during synthesis.

However, in the conventional organic electrolyte battery, oxidative decomposition of the organic substance was considered to be unavoidable under high voltages of about 4 V or higher, and there was concern that battery performance would suffer as a result of the accumulation of byproducts at the positive electrode/electrolyte interface due to oxidative decomposition of the organic substance used in the electrolyte as charging and discharging were repeated. Besides the change in valence of the metal ions that are naturally expected to react when the positive electrode itself is under high voltage, another concern was irreversible charge compensation due to oxygen desorption, and the suppression of these phenomena was considered necessary for the effective functioning of a high-voltage positive electrode.

The inventors have therefore proposed a secondary battery in which an organic electrolyte is interposed between the positive electrode material and the negative electrode material in the "secondary battery" of Patent Document 1 with the object of providing a secondary battery capable of suppressing oxidative decomposition of the organic electrolyte and desorption of oxygen from the positive electrode active material, wherein the secondary battery is characterized in that an inorganic solid electrolyte film is formed in advance between the positive electrode material and the organic electrolyte.

According to this invention, oxidative decomposition of the organic electrolyte by the positive electrode material of the secondary battery that acts as an oxidizing agent during charging can be suppressed by the inorganic solid electrolyte film formed between the positive electrode material and the organic electrolyte, and desorption of oxygen from the positive electrode material can also be suppressed. The organic electrolyte can therefore be prevented from degrading, and a high voltage during discharge can be maintained for a long time even when charging and discharging are repeated.

Figure 15:
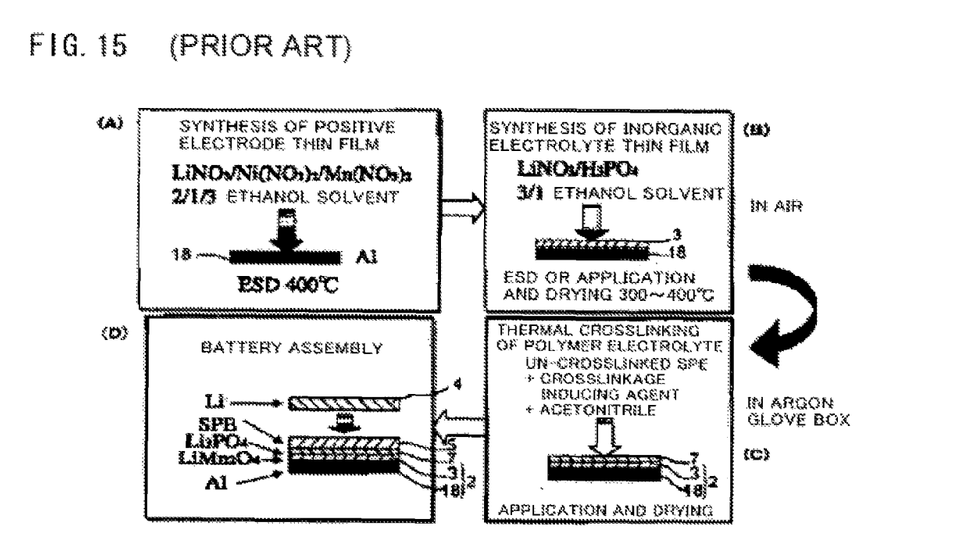
FIG. 15 is a diagram showing the procedure for manufacturing the secondary battery described in Patent Document 1.

FIG. 15 shows a schematic view of the procedure for manufacturing the secondary battery described in Patent Document 1 as a reference.

The positive electrode sheet of this secondary battery is manufactured by a process in which a positive electrode active material (3) is applied on a metal electrode substrate (18) by an electrostatic discharge (ESD) method using an electrostatic discharge device, and the metal electrode substrate is then heated to evaporate the solvent. An inorganic solid electrolyte film (7) having a thickness of about 10 nm and an organic electrolyte (solid polymer electrolyte) film (5) are formed on the positive electrode sheet, and the assembly is pressure bonded to a negative electrode material (4), whereby the secondary battery is formed.

[Patent Document 1] Japanese Laid-open Patent Application 2003-338321

DISCLOSURE OF INVENTION

Problems to Be Solved by the Invention

However, the secondary battery described in the abovementioned Patent Document 1 has problems in that the film of the positive electrode active material must be formed with an extremely small thickness on the electrode substrate in order for electrons to be transferred from the metal electrode substrate to the positive electrode active material, and a secondary battery having a large capacity and high energy density is therefore difficult to create.

The present invention was developed in order to overcome such problems as those described above, and an object of the present invention is to provide an organic electrolyte battery that is capable of attaining high energy density and of dramatically enhancing cycle characteristics by suppressing oxidative degradation of the organic electrolyte under high voltage, and to provide a method for manufacturing a positive electrode sheet used in the organic electrolyte battery.

Means for Solving the Problem

A first aspect of the present invention for achieving the abovementioned objects is a solid polymer electrolyte battery in which a solid polymer electrolyte is interposed between a positive electrode material and a negative electrode material, wherein the organic electrolyte battery is characterized in that positive electrode active material particles that constitute a positive electrode have surfaces at least partially coated by an attachment that has ionic conductance and electronic conductance and is not easily oxidized even when supplied with oxygen from the positive electrode active material, and at least part of the surface of the active material particles is in a state in which there is no direct contact with the solid polymer electrolyte.

In the present invention, even when particles of a positive electrode active material are used in the positive electrode to increase the energy density, oxidative decomposition of the solid polymer electrolyte is suppressed by an ionically or electronically conductive attachment for coating all or a portion of the surfaces of the positive electrode active material particles that act as an oxidizing agent during charging, and desorption of oxygen from the positive electrode active material particles is suppressed. The solid polymer electrolyte can therefore be prevented from degrading, and a solid polymer electrolyte battery can therefore be provided in which high voltage during discharge can be maintained for a long time even when charging and discharging are repeated. Because the conduction path is also preserved, electrons can be smoothly transferred to the positive electrode active material, and high energy density can be attained in the solid polymer electrolyte battery.

At least a portion of the surfaces of the positive electrode active material particles must be coated by the attachment. The reason for adopting this configuration is that the ionically conductive attachment acts as a gateway through which metal ions escape to the solid polymer electrolyte, the positive electrode active material and the solid polymer electrolyte are prevented from coming into direct contact with each other, and oxidative decomposition of the solid polymer electrolyte in that portion can be suppressed. Since the surface portions of the positive electrode active material particles that are not coated by the attachment do not form a gateway for metal ions to escape to the solid polymer electrolyte, the accumulation of byproducts in the interface between the positive electrode active material particles and the solid polymer electrolyte in the portions not coated by the attachment does not cause a significant reduction in battery performance.

In the solid polymer electrolyte battery according to a second aspect in this case, the attachment comprises microparticles of an inorganic solid electrolyte that has ionic conductance, and microparticles of a conducting material that has electronic conductance. Alternatively, in the solid polymer electrolyte battery according to a third aspect, the attachment comprises microparticles of an inorganic substance that has ionic conductance and electronic conductance.

More specifically, a fourth aspect of the present invention is characterized in that the solid polymer electrolyte battery is a polymer lithium secondary battery, and the positive electrode active material particles that constitute a positive electrode have surfaces that comprise lithium ions and are at least partially coated by an attachment that has lithium ionic conductance and electronic conductance and is not easily oxidized even when supplied with oxygen from the positive electrode active material.

In this case, the solid polymer electrolyte battery according to a fifth aspect is characterized in that the attachment comprises microparticles of an inorganic solid electrolyte that has lithium ionic conductance, and microparticles of a conducting material that has electronic conductance; and the microparticles of an inorganic solid electrolyte are composed of any of lithium-containing phosphates, silicates, borates, sulfates, and aluminates or a mixture of the same. Specifically, according to a sixth aspect, any of $Li_3XO_4$ (X=P, As, V), $Li_4XO_4$ (X=Si, Ge, Ti), $Li_{3+x}A_xB_{1-x}O_4$ (A=Si, Ge, Ti; B=P, As, V; 0<x<0.6), $Li_{1+x}A_xB_{2-y}(PO_4)_3$ (A=Al, Ge, Sn, Hf, Zr, Sc, Y; B=Ti, Ge, Zn; 0<x<0.5), LiPON, $Li_2BO_3$, $Li_2SO_4$, $Li_{4+x}A_xSi_{1-x}O_4$ (A=B, Al, Ga, Cr, Fe; 0<x<0.4) (A=Ni, Co; 0<x<0.1) $Li_{4-3y}Al_ySiO_4$ (0<y<0.06) $Li_{4-2y}Zn_yGeO_4$ (0<y<0.25) $LiPF_6$, $LiBF_4$, $LiN(SO_2CF_3)_2$, $LiN(SO_2C_2F_5)_2$, $LiN(SO_2C_3F_7)_2$, LiF, LiCl, LiBr, $LiAlO_2$, and $LiMPO_4$ (M=Mn, Fe, Co, Ni), or a mixture of the compounds above is used in the microparticles of an inorganic solid electrolyte; and any of acetylene black, Ketjen Black, carbon nanotubes, and other electronically conductive carbon materials; metal microparticles, metal fibers, and other metal materials; and electronically conductive ceramic materials, or a mixture of the materials above is used in the microparticles of a conducting material.

According to a seventh aspect, a weight percent concentration of an inorganic solid electrolyte that is mixed with respect to the positive electrode active material is preferably 0.1% to 50%, and a weight percent concentration of a conducting material that is mixed with respect to the positive electrode active material is preferably 0.05% to 10%.

The invention according to an eighth aspect is a method for manufacturing a positive electrode sheet used in a solid polymer electrolyte battery in which a solid polymer electrolyte is interposed between a positive electrode material and a negative electrode material, wherein the method for manufacturing a positive electrode sheet used in a solid polymer electrolyte battery is characterized in comprising forming a layer that has anti-oxidation properties, ionic conductance, and electronic conductance on all or a portion of a surface of active material particles by mixing and stirring particles of an ionically conductive inorganic solid electrolyte and particles of an electronically conductive conducting material into the active material particles that constitute a positive electrode; kneading the [resulting mixture] with a solvent and a solid polymer electrolyte that doubles as a binder; applying the resulting mixture to a positive electrode collector; and pressure-molding the [resulting assembly], whereby a condition is achieved in which at least part of the surface of the active material particles is not indirect contact with the solid polymer electrolyte.

The invention according to a ninth aspect is a method for manufacturing a positive electrode sheet used in a solid polymer electrolyte battery in which a solid polymer electrolyte is interposed between a positive electrode material and a negative electrode material, wherein the method for manufacturing a positive electrode sheet used in a solid polymer electrolyte battery is characterized in comprising attaching particles of an ionically conductive inorganic solid electrolyte in a scattered manner to surfaces of active material particles that constitute a positive electrode, and then attaching particles of an electronically conductive conducting material to the surfaces of the active material particles; kneading the [resulting mixture] with a solvent and an organic electrolyte that doubles as a binder; applying the [resulting mixture] to a positive electrode collector; and pressure-molding the [resulting assembly], whereby a condition is achieved in which at least part of the surface of the active material particles is not in direct contact with the solid polymer electrolyte.

The invention according to a tenth aspect is a method for manufacturing a positive electrode sheet used in a solid polymer electrolyte battery in which a solid polymer electrolyte is interposed between a positive electrode material and a negative electrode material, wherein the method for manufacturing a positive electrode sheet used in a solid polymer electrolyte battery is characterized in comprising attaching an inorganic solid electrolyte in a scattered manner to surfaces of active material particles by mixing particles of an ionically conductive inorganic solid electrolyte with active material particles that constitute a positive electrode; kneading the [resulting mixture] with particles of an electronically conductive conducting material, a solvent, and a solid polymer electrolyte that doubles as a binder; applying the [resulting mixture] to a positive electrode collector; and pressure-molding the [resulting assembly], whereby a condition is achieved in which at least part of the surface of the active material particles is not in direct contact with the solid polymer electrolyte.

The invention according to an eleventh aspect is a method for manufacturing a positive electrode sheet used in a solid polymer electrolyte battery in which a solid polymer electrolyte is interposed between a positive electrode material and a negative electrode material, wherein the method for manufacturing a positive electrode sheet used in an organic electrolyte battery is characterized in comprising kneading active material particles that constitute a positive electrode, particles of an ionically conductive inorganic solid electrolyte, particles of an electronically conductive conducting material, a solvent, and a solid polymer electrolyte that doubles as a binder; applying the [resulting mixture] to a positive electrode collector; and pressure-molding the [resulting assembly], whereby a condition is achieved in which at least part of the surface of the active material particles is not in direct contact with the solid polymer electrolyte.

The invention according to a twelfth aspect is a method for manufacturing a positive electrode sheet used in a solid polymer electrolyte battery in which a solid polymer electrolyte is interposed between a positive electrode material and a negative electrode material, wherein the method for manufacturing a positive electrode sheet used in a solid polymer electrolyte battery is characterized in comprising attaching one or both types of particles selected from particles of an ionically conductive inorganic solid electrolyte and particles of an electronically conductive conducting material to all or a portion of surfaces of active material particles by mixing and stirring one or both types of particles selected from particles of an ionically conductive inorganic solid electrolyte and particles of an electronically conductive conducting material into the active material particles that constitute a positive electrode; kneading the [resulting mixture] with a solvent, a solid polymer electrolyte that doubles as a binder, and one or both types of particles selected from particles of an ionically conductive inorganic solid electrolyte and particles of an electronically conductive conducting material; applying the [resulting mixture] to a positive electrode collector; and pressure-molding the [resulting assembly], whereby a condition is achieved in which at least part of the surface of the active material particles is not in direct contact with the solid polymer electrolyte.

The method for manufacturing a positive electrode sheet used in a solid polymer electrolyte battery according to the eight through twelfth aspects is a method for manufacturing the solid polymer electrolyte battery according to any of the first through seventh aspects.

The secondary battery described in Patent Document 1 is created by a process in which a positive electrode sheet (positive electrode material) is created by forming a thin film of a positive electrode active material binder, and in which an inorganic solid electrolyte film and solid polymer electrolyte film are formed on the positive electrode sheet, and the assembly is pressure bonded to a negative electrode material. However, a secondary battery (solid polymer electrolyte battery) is created in the present invention by a process in which a positive electrode active material, a solid electrolyte, and a conducting material are kneaded with a solvent and a solid polymer electrolyte that doubles as a binder; the [resulting mixture] is applied on a metal electrode substrate; the assembly is pressed to create a positive electrode sheet, whereby a condition is achieved in which at least part of the surface of the active material particles is not in direct contact with the solid polymer electrolyte; and the positive electrode sheet is pressure bonded to a negative electrode material. Therefore, the manufacturing method of the present invention is capable of more easily providing a solid polymer electrolyte battery that is capable of attaining high energy density through the use of positive electrode active material particles and of dramatically enhancing cycle characteristics by suppressing oxidative degradation of the solid polymer electrolyte under high voltage, in the same manner as in the secondary battery described in Patent Document 1.

BRIEF DESCRIPTION OF THE REFERENCE SYMBOLS 1 positive electrode sheet
2 positive electrode material
3 positive electrode active material film
4 negative electrode material
5 solid polymer electrolyte film
6 solid polymer electrolyte
7 inorganic solid electrolyte film
8 positive electrode active material particles
10 solid polymer electrolyte battery
12 attachment
14 inorganic solid electrolyte
16 conducting material
18 positive electrode collector (metal electrode substrate)
20 positive electrode sheet

BEST MODE FOR CARRYING OUT THE INVENTION

The structure of the present invention will be described in detail hereinafter on the basis of a preferred embodiment shown in the drawings.

Figure 1:
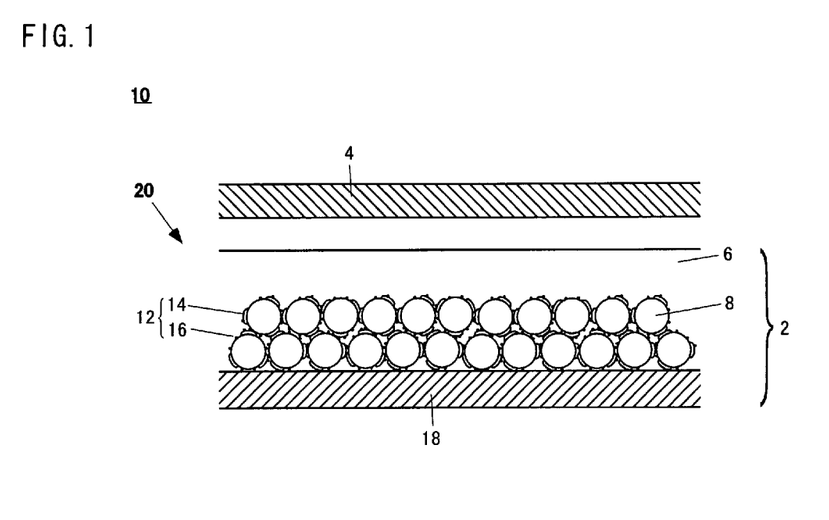
FIG. 1 is a schematic sectional view showing a solid polymer electrolyte battery in which the present invention is applied.

FIG. 1 is a schematic view of an example of an embodiment of a secondary battery in which the present invention is applied. A solid polymer electrolyte is interposed between a positive electrode material and a negative electrode material in the secondary battery. Microparticles of an ionically conductive inorganic solid electrolyte, and microparticles of an electronically conductive conducting material are attached to the surfaces of the positive electrode active material particles constituting the positive electrode.

The secondary battery of the present embodiment is, e.g., a composite all-solid secondary battery, and the electrolyte is a solid polymer electrolyte. The secondary battery is also a lithium polymer secondary battery.

The positive electrode material 2 is composed, for example, of a metal electrode substrate 18 as an electrode material substrate, a positive electrode active material 8 in which microparticles of an ionically conductive inorganic solid electrolyte 14 and microparticles of an electronically conductive conducting material 16 are attached on the metal electrode substrate, and a solid polymer electrolyte/binder for fixing the positive electrode active material 8 to the metal electrode substrate and improving ion exchange with a layer of a solid polymer electrolyte 6. The positive electrode active material 8 is applied to the metal electrode substrate by a doctor blade method, a silkscreen method, or another method.

Aluminum, for example, is used in the metal electrode substrate 18, but the metal used is not limited, and may be nickel, stainless steel, gold, platinum, titanium, or the like.

The positive electrode active material particles 8 are formed using, e.g., LiMn$_2$O$_4$, LiCoO$_2$, or LiNiO$_2$, a mixture of these compounds, or a composition made up of solutions of these compounds, but this configuration is not limiting. Salts of lithium compounds and oxides of transition metals, for example, may be used as starting materials, specific examples of which include mixtures of lithium carbonate (Li$_2$CO$_3$), cobalt oxide (Co$_3$O$_4$), and the like, as well as mixtures of lithium carbonate (Li$_2$CO$_3$), nickel nitrate (Ni(NO$_3$)$_2$), manganese nitrate (Mn(NO$_3$)$_2$), and the like. The particles of the positive electrode active material used have a grain size of 50 microns or less, preferably 20 microns or less.

The microparticles of the inorganic solid electrolyte 14 are composed of a material (e.g., Li$_3$PO$_4$) that includes lithium ions and is not easily oxidized even when supplied with oxygen from the positive electrode active material particles. However, the inorganic solid electrolyte is not limited to this material, and may be composed of any of lithium-containing phosphates, silicates, borates, sulfates, and aluminates or a mixture of the same. Specifically, the inorganic solid electrolyte may be any of Li$_3$XO$_4$ (X=As, V), Li$_4$XO$_4$ (X=Si, Ge, Ti), Li$_{3+x}$A$_x$B$_{1-x}$O$_4$ (A=Si, Ge, Ti; B=P, As, V; 0<x<0.6), Li$_{1+x}$A$_x$B$_{2-y}$(PO$_4$)$_3$ (A=Al, Ge, Sn, Hf, Zr, Sc, Y; B=Ti, Ge, Zn; 0<x<0.5), LiPON, Li$_2$BO$_3$, Li$_2$SO$_4$, Li$_{4+x}$A$_x$Si$_{1-x}$O$_4$ (A=B, Al, Ga, Cr, Fe; 0<x<0.4) (A=Ni, Co; 0<x<0.1) Li$_{4-3y}$Al$_y$SiO$_4$ (0<y<0.06) Li$_{4-2y}$Zn$_y$GeO$_4$ (0<y<0.25) LiPF$_6$, LiBF$_4$, LIN(SO$_2$CF$_3$)$_2$, LiN(SO$_2$C$_2$F$_5$)$_2$, LiN(SO$_2$C$_3$F$_7$)$_2$, LiF, LiCl, LiBr, LiAlO$_2$, and LiMPO$_4$ (M=Mn, Fe, Co, Ni), or a mixture of the compounds above. The microparticles of the inorganic solid electrolyte used preferably have a grain size that is about ⅓ or less of the grain size of the positive electrode active material particles. The weight percent concentration of the inorganic solid electrolyte that is mixed with respect to the positive electrode active material may be set to 0.1% to 50%, but a weight percent concentration of about 0.1% to 40% is preferred.

Any of acetylene black, Ketjen Black, carbon nanotubes, and other electronically conductive carbon materials; metal microparticles, metal fibers, and other metal materials; and electronically conductive ceramic materials, or a mixture of the materials above is used in the microparticles of the conducting material. The microparticles of the conducting material used preferably have a grain size that is about 1/100 or less of the grain size of the positive electrode active material particles. The weight percent concentration of the conducting material that is mixed with respect to the positive electrode active material may be set to 0.05% to 10%, but a weight percent concentration of about 0.5% to 5% is preferred. The conducting material is added merely as a supplement and is sometimes unnecessary when the inorganic solid electrolyte itself has ionic conductance and electronic conductance.

The three states described below are the states in which the electronically conductive conducting material and the microparticles of the ionically conductive inorganic solid electrolyte are attached to the surfaces of the positive electrode active material particles constituting the positive electrode.

(a) Particles of the inorganic solid electrolyte and particles of the conducting material are attached to substantially the entire surfaces of the positive electrode active material particles.

(b) The surfaces of the positive electrode active material particles are coated with an inorganic solid electrolyte layer, and particles of the conducting material are attached to the surfaces of the positive electrode active material particles.

(b-1) The surfaces of the positive electrode active material particles are substantially entirely covered by the inorganic solid electrolyte layer.

(b-2) The surfaces of the positive electrode active material particles are covered in a scattered manner by the inorganic solid electrolyte layer.

(c) Particles of the inorganic solid electrolyte and particles of the conducting material are attached in a scattered manner to the surfaces of the positive electrode active material particles.

These states of attachment of the inorganic solid electrolyte and the like (of the positive electrode sheet) to the positive electrode active material are created according to the procedures described below.

Figure 2:
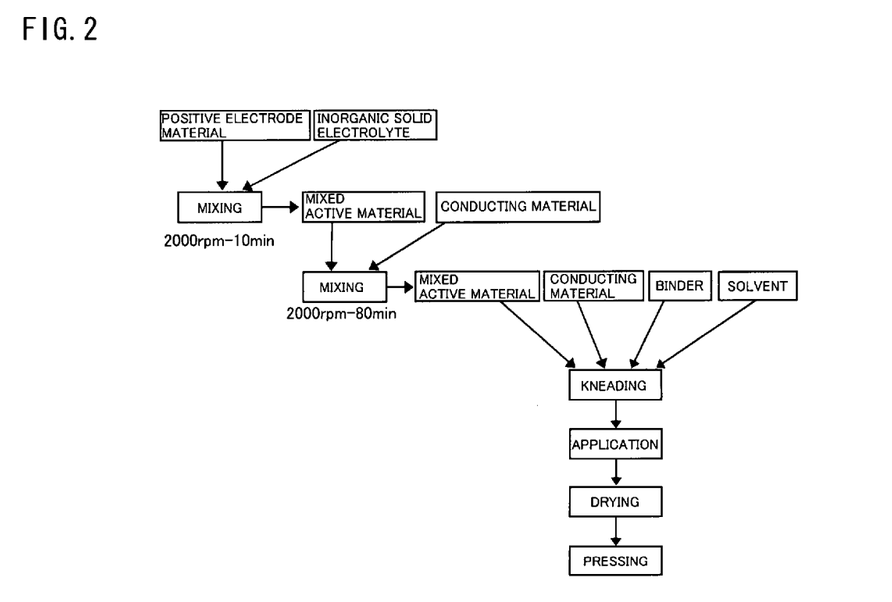
FIG. 2 is a flow diagram of an electrode manufacturing process whereby a positive electrode active material, an inorganic solid electrolyte, and a conducting material are mixed in sequence to create an electrode.

To create state (a), particles of the inorganic solid electrolyte are mixed with the positive electrode active material particles and gently stirred (for 10 minutes at 2,000 rpm) in a surface coating device for coating the surfaces of particles by subjecting the particles in dry form to compression/shear energy; the particles of the conducting material are then added and stirred (for 80 minutes at 2,000 rpm) by the surface coating device; the resulting mixture is kneaded with particles of the conducting material, the solid polymer electrolyte that doubles as a binder, and a solvent; the kneaded mixture is applied to a positive electrode collector; and the [resulting assembly] is then pressure molded (see FIG. 2).

Figure 3:
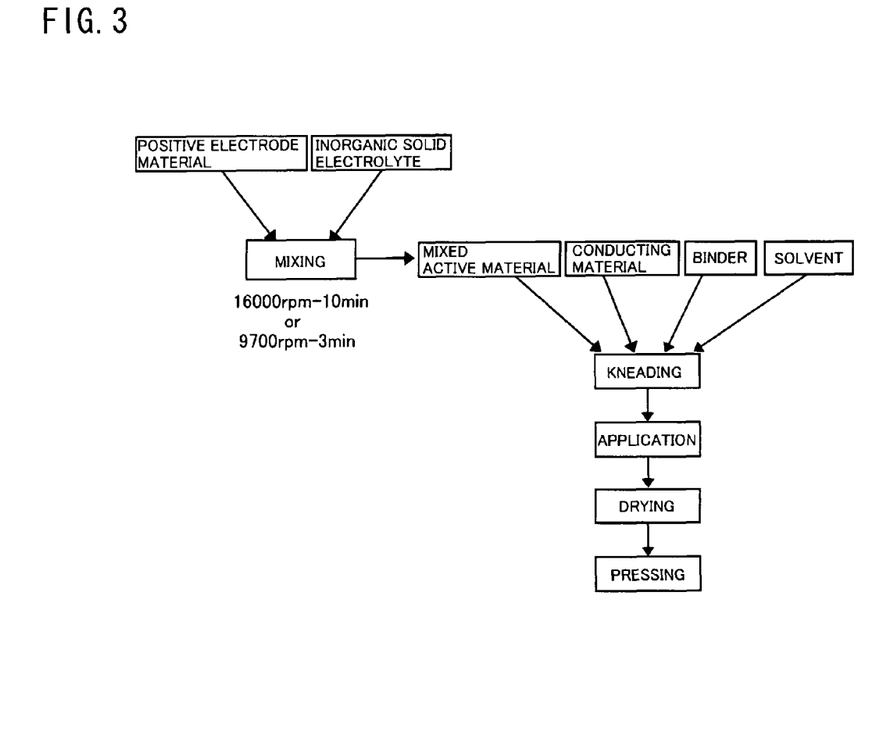
FIG. 3 is a flow diagram of an electrode manufacturing process whereby a positive electrode active material and an inorganic solid electrolyte are mixed to create an electrode.

To create state (b-1), particles of a relatively soft inorganic solid electrolyte are mixed with the positive electrode active material particles and stirred (for 10 minutes at 16,000 rpm) in a device that uses centrifugal force to coat the surfaces of particles through impact force; a mixture in which the surfaces of the positive electrode active material particles are substantially entirely coated by the inorganic solid electrolyte is kneaded with particles of the conducting material, the solid polymer that doubles as a binder, and the solvent; the kneaded mixture is applied to the positive electrode collector; and the [resulting assembly] is pressure molded (see FIG. 3).

To create state (b-2), particles of an inorganic solid electrolyte having high ion conductivity and hardness are mixed with the positive electrode active material particles and stirred (for 3 minutes at 9,700 rpm) in a device that uses centrifugal force to coat the surfaces of particles through impact force; a mixture in which the surfaces of the positive electrode active material particles are coated in a scattered manner by the inorganic solid electrolyte is kneaded with particles of the conducting material, the solid polymer electrolyte that doubles as a binder, and the solvent; the kneaded mixture is applied to the positive electrode collector; and the [resulting assembly] is pressure molded (see FIG. 3).

Figure 4:
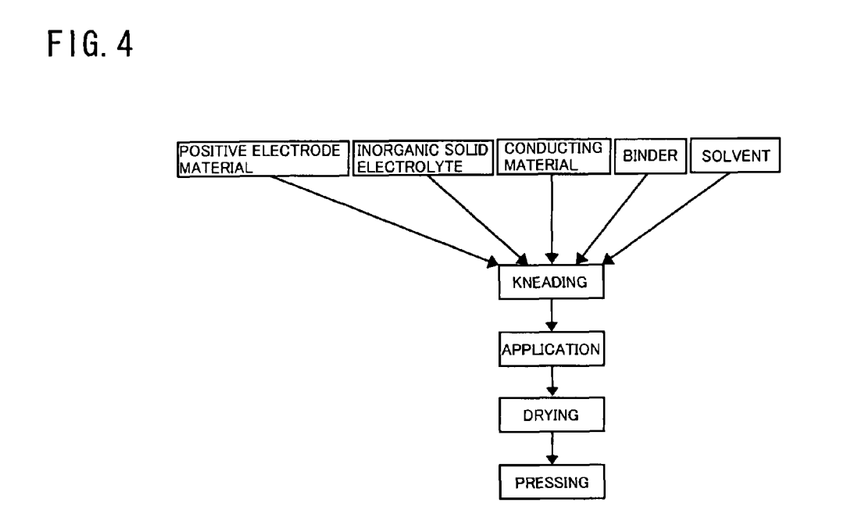
FIG. 4 is a flow diagram of an electrode manufacturing process whereby a positive electrode active material, an inorganic solid electrolyte, a conducting material, a binder, and a solvent are mixed in sequence to create an electrode.

To create state (c), the positive electrode active material particles, the particles of the inorganic solid electrolyte, the particles of the conducting material, the solid polymer electrolyte that doubles as a binder, and the solvent are kneaded together; the kneaded mixture is applied to the positive electrode collector; and the [resulting assembly] is pressure molded (see FIG. 4).

Figure 5:
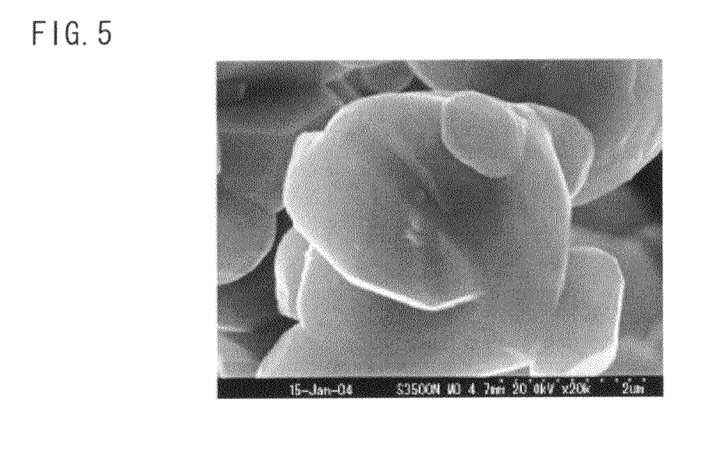
FIG. 5 is a scanning electron micrograph (SEM) of an uncoated positive electrode active material ($LiCoO_2$)
Figure 6:
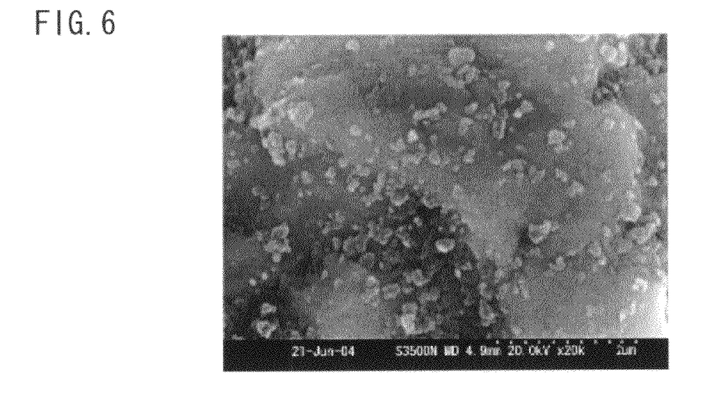
FIG. 6 is a scanning electron micrograph (SEM) of a positive electrode active material ($LiCoO_2$) whose surfaces are coated by an inorganic solid electrolyte ($Li_3PO_4$) and a conducting material (acetylene black) mixed in sequence.

FIG. 5 is a scanning electron micrograph showing the surface state prior to coating of the positive electrode active material particles used. FIG. 6 is a scanning electron micrograph showing the state of attachment of the inorganic solid electrolyte and the conducting material on the positive electrode active material particles according to state (a) described above.

As is apparent from the micrographs, the inorganic solid electrolyte (together with the conducting material) is closely attached to substantially the entire surface of the positive electrode active material particles. A layer having oxidation resistance, ionic conductance, and electronic conductance is thereby formed on the surfaces of the positive electrode active material particles. Microparticles of excess acetylene black as the conducting material are also attached to the coated active material surfaces.

Figure 7:
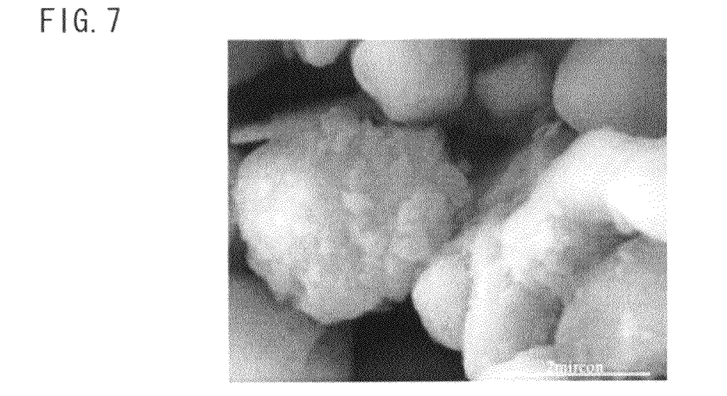
FIG. 7 is a scanning electron micrograph (SEM) of a positive electrode active material (LiCoO2) whose surfaces are coated by a mixture of an inorganic solid electrolyte ($Li_{1.5}Al_{0.5}Ge_{1.5}(PO_4)_3$)

FIG. 7 is a scanning electron micrograph showing the state of attachment of the inorganic solid electrolyte to the positive electrode active material particles according to state (b-2) described above. As is apparent from the micrograph, the inorganic solid electrolyte is attached in a scattered manner to the surfaces of the positive electrode active material particles, and the other portions of the surfaces of the positive electrode active material particles are exposed.

The positive electrode active material and the like are formed on the metal electrode substrate by a doctor blade method, for example.

In the doctor blade method, the positive electrode active material and the like are dispersed in an organic solvent to form a slurry that is applied to a metal electrode substrate, and the applied slurry layer is then given an appropriate uniform thickness by a blade that has a prescribed slit width. The electrode thus coated is dried in a vacuum at 80° C., for example, to remove the excess organic solvent. A positive electrode sheet is manufactured by pressure molding the dried electrode using a pressing device (not shown).

A solid polymer electrolyte that does not include the positive electrode active material or the like is then applied, and a negative electrode sheet made of lithium or the like, for example, is then layered on the assembly, whereby a solid polymer electrolyte battery is manufactured.

WORKING EXAMPLE 1

An all-solid lithium secondary battery (lithium polymer battery, LPB (lithium polymer battery)) was fabricated in order to confirm the possibility of creating a composite all-solid battery that is provided with both high energy density and high safety, and that utilizes a high-voltage positive electrode whereby the number of assembled batteries can be reduced.

[Experiment a] (Creation of a Positive Electrode Material that Uses a Positive Electrode Active Material Having Surface State (a) Described Above)

The polymer matrix used in the solid polymer electrolyte (organic electrolyte, SPE (Solid Polymer Electrolyte)) was Daiso Co. (Ltd.) P(EO/MEEGE/AGE)=82/18/1.7. The ratio of LiTFSI(LiN($SO_2CF_3$)$_2$) in the polymer used as the electrolyte salt was [Li]/[either oxygen]=0.06.

After the pre-mixing of $LiCoO_2$ and $Li_3PO_4$ in a weight ratio of 20:1 in a plastic bag, the mixture was placed in a surface coating device. The mixture was then treated for 10 minutes at a rotational speed of 2,000 rpm, after which acetylene black was placed in the surface coating device in a $LiCoO_2$: acetylene black weight ratio of 100:2, and the mixture was further treated for 80 minutes at a rotational speed of 2,000 rpm and provided for fabrication of a positive electrode sheet. In this complexing process, the particle surfaces were substantially entirely coated by applying compression/shear energy to the particles in dry form.

Processed $LiCoO_2$, acetylene black as the conducting material, and P(EO/MEEGE)-LiBETI(LiN($SO_2CF_2CF_3$)$_2$) ([Li]/[O]=0.06) as the ionically conductive binder were used in the positive electrode sheet. The positive electrode materials in a weight ratio of (positive electrode active material)/(conducting material)/(binder)=82/5/13 were introduced into acetonitrile and stirred by a homogenizer, after which an automatic applicator/doctor blade was used to apply the mixture to an aluminum collector. After the acetonitrile was dried, the electrode was pressure bonded in a press, and the resulting product was used. The positive electrode sheet thus fabricated was vacuum-dried overnight or longer at 80° C., and then continually stored in a glove box in an argon atmosphere.

During battery formation, the positive electrode sheet, the SPE sheet, and the Li negative electrode were each cut out by a punch to a prescribed radius, bonded together in the glove box in the argon atmosphere, and then sealed in a 2032-type coin battery to create a battery.

[Experimental Results]

Figure 8:
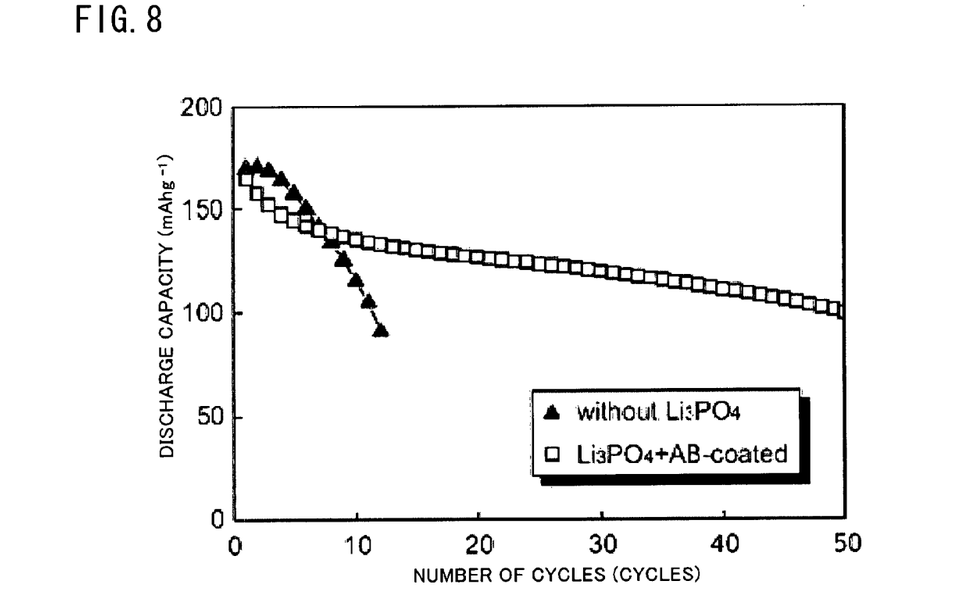
FIG. 8 shows the charge/discharge characteristics of a solid polymer electrolyte battery that uses an uncoated [positive electrode active material] $LiCoO_2$ and a positive electrode active material ($LiCoO_2$) whose surfaces are coated by an inorganic solid electrolyte ($Li_3PO_4$) and a conducting material (acetylene black) mixed in sequence.

Charge-discharge testing of the abovementioned battery was performed at 3.0 to 4.4 V, a current density of 0.05 mAcm$^{-2}$, and a temperature of 60° C. FIG. 8 shows the change over time in the discharge capacity in repeated charge/discharge cycles. In the battery coated with $Li_3PO_4$ and acetylene black (Working Example a, $Li_3PO_4$+AB-coated), an initial capacity of approximately 170 mAhg$^{-1}$ was obtained, the battery also had satisfactory charge/discharge reversibility thereafter, and a discharge capacity of approximately 100 mAhg$^{-1}$ was maintained after 50 cycles.

The battery in which coating treatment was not performed (Comparative Example a, without $Li_3PO_4$) had an initial capacity of 170 mAhg$^{-1}$, which was substantially equal to that of the coated battery, but the capacity decreased significantly through the cycles, and decreased to approximately 100 mAhg$^{-1}$ after 10 cycles.

[Experiment b-1] (Creation of a Positive Electrode Material that Uses a Positive Electrode Active Material Having Surface State (b-1) Described Above)

After the pre-mixing of $LiCoO_2$ and $Li_3PO_4$ in a weight ratio of 20:1 in a plastic bag, the mixture was placed in a surface coating device. The mixture was then treated for 10 minutes at a rotational speed of 16,000 rpm and provided for fabrication of a positive electrode sheet. In this complexing process, the particle surfaces were coated by particle impacts using centrifugal force.

Processed $LiCoO_2$, acetylene black as the conducting material, and P(EO/MEEGE)-LiBETI(LiN(SO$_2$CF$_2$CF$_3$)$_2$) ([Li]/[O]=0.06) as the ionically conductive binder were used in the positive electrode sheet. The positive electrode materials in a weight ratio of (positive electrode active material)/(conducting material)/(binder)=82/5/13 were introduced into acetonitrile and stirred by a homogenizer, after which an automatic applicator/doctor blade was used to apply the mixture to an aluminum collector. After the acetonitrile was dried, the electrode was pressure bonded in a press, and the resulting product was used. The positive electrode sheet thus fabricated was vacuum-dried overnight or longer at 80° C., and then continually stored in a glove box in an argon atmosphere.

During battery formation, the positive electrode sheet, the SPE sheet, and the Li negative electrode were each cut out by a punch to a prescribed radius, bonded together in the glove box in the argon atmosphere, and then sealed in a 2032-type coin battery to create a battery.

[Experimental Results]

Figure 9:
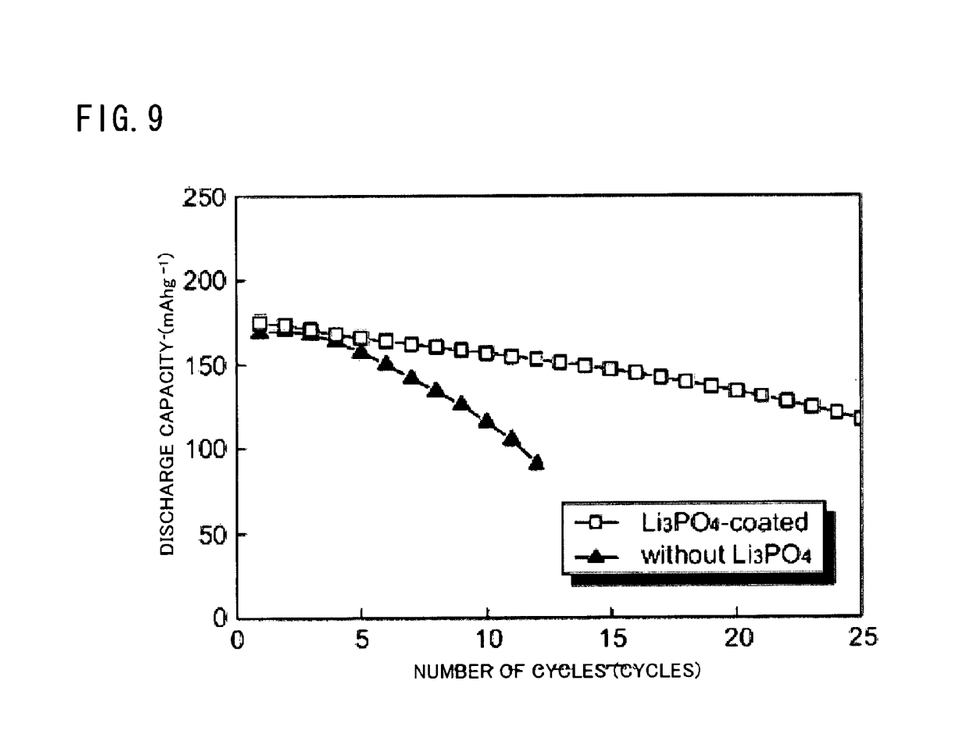
FIG. 9 shows the charge/discharge characteristics of a solid polymer electrolyte battery that uses an uncoated [positive electrode active material] $LiCoO_2$ and a positive electrode active material ($LiCoO_2$) whose surfaces are coated by a mixture of an inorganic solid electrolyte ($Li_3PO_4$)

Charge-discharge testing of the abovementioned battery was performed at 3.0 to 4.4 V, a current density of 0.05 mAcm$^{-2}$, and a temperature of 60° C. FIG. 9 shows the change over time in the discharge capacity in repeated charge/discharge cycles. In the battery coated with $Li_3PO_4$ (Working Example b-1, $Li_3PO_4$-coated), an initial capacity of approximately 170 mAhg$^{-1}$ was obtained, the battery also had satisfactory charge/discharge reversibility thereafter, and a discharge capacity of approximately 120 mAh$^{-1}$ was maintained after 25 cycles.

The battery in which coating treatment was not performed (Comparative Example b-1, without $Li_3PO_4$) had an initial capacity of 170 mAhg$^{-1}$, which was substantially equal to that of the coated battery, but the capacity decreased significantly through the cycles, and decreased to approximately 100 mAhg$^{-1}$ after 10 cycles.

[Experiment b-2] (Creation of a Positive Electrode Material that Uses a Positive Electrode Active Material Having Surface State (b-2) Described Above)

After the pre-mixing of $LiCoO_2$ and $Li_{1.5}Al_{0.5}Ge_{1.5}(PO_4)_3$ (LAGP) in a weight ratio of 20:1 in a plastic bag, the mixture was placed in a surface coating device. The mixture was then treated for 3 minutes at a rotational speed of 9,700 rpm and provided for fabrication of a positive electrode sheet. In this complexing process, the particle surfaces were coated by particle impacts using centrifugal force.

Processed $LiCoO_2$, acetylene black as the conducting material, and P(EO/MEEGE)-LiBETI(LiN(SO$_2$CF$_2$CF$_3$)$_2$) ([Li]/[O]=0.06) as the ionically conductive binder were used in the positive electrode sheet. The positive electrode materials in a weight ratio of (positive electrode active material)/(conducting material)/(binder)=82/5/13 were introduced into acetonitrile and stirred by a homogenizer, after which an automatic applicator/doctor blade was used to apply the mixture to an aluminum collector. After the acetonitrile was dried, the electrode was pressure bonded in a press, and the resulting product was used. The positive electrode sheet thus fabricated was vacuum-dried overnight or longer at 80° C., and then continually stored in a glove box in an argon atmosphere.

During battery formation, the positive electrode sheet, the SPE sheet, and the Li negative electrode were each cut out by a punch to a prescribed radius, bonded together in the glove box in the argon atmosphere, and then sealed in a 2032-type coin battery to create a battery.

[Experimental Results]

Figure 10:
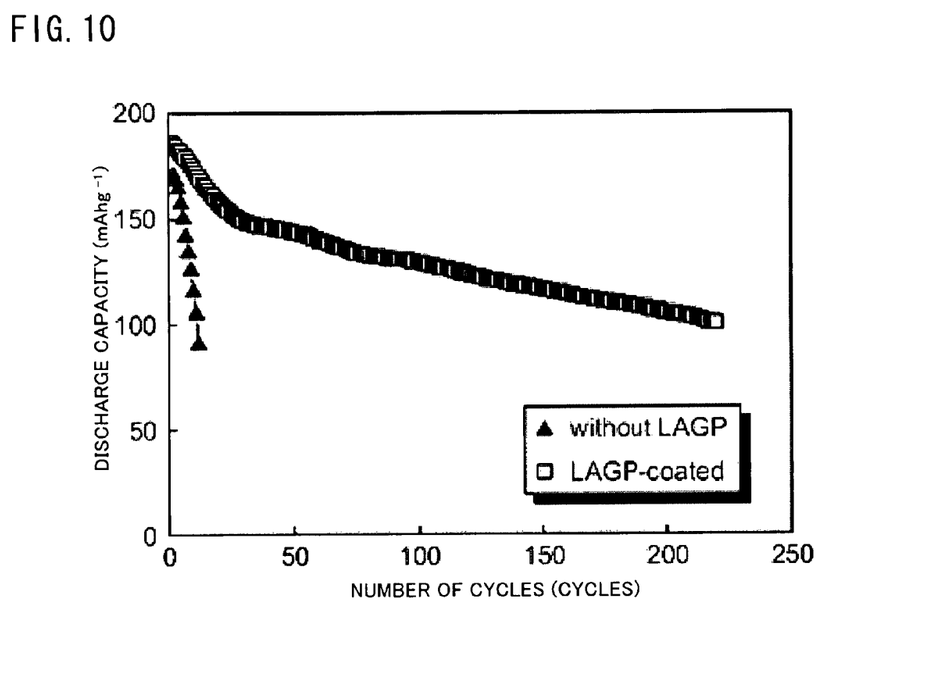
FIG. 10 shows the charge/discharge characteristics of a solid polymer electrolyte battery that uses an uncoated [positive electrode active material] $LiCoO_2$ and a positive electrode active substance ($LiCoO_2$) whose surfaces are coated by a mixture of an inorganic solid electrolyte ($Li_{1.5}Al_{0.5}Ge_{1.5}(PO_4)_3$)

Charge-discharge testing of the abovementioned battery was performed at 3.0 to 4.4 V, a current density of 0.10 mAcm$^{-2}$, and a temperature of 60° C. FIG. 10 shows the change over time in the discharge capacity in repeated charge/discharge cycles. In the battery coated with $Li_{1.5}Al_{0.5}Ge_{1.5}(PO_4)_3$ (Working Example b-2, LAGP-coated), an initial capacity of approximately 180 mAhg$^{-1}$ was obtained, the battery also had satisfactory charge/discharge reversibility thereafter, and a discharge capacity of approximately 105 mAh$^{-1}$ (*3) was maintained after 200 cycles despite the fact that the current density was higher than in Comparative Example b-1. The battery in which coating treatment was not performed (Comparative Example b-2, without LAGP, wherein current density was 0.05 mAcm$^{-2}$) had an initial capacity of 170 mAhg$^{-1}$, but the capacity decreased significantly through the cycles, and decreased to approximately 100 mAhg$^{-1}$ after 10 cycles.

[Experiment c-1] (Creation of a Positive Electrode Material that Uses a Positive Electrode Active Material Having Surface State (c) Described Above (Part 1))

A pre-mixture of $LiCoO_2$ and $Li_3PO_4$ in a weight ratio of 100:2, 100:5, 100:10, or 100:20 was prepared in a reagent bottle, and the mixture was provided for fabrication of a positive electrode sheet. The mixture of $LiCoO_2$ and $Li_3PO_4$, acetylene black as the conducting material, and P(EO/MEEGE)-LiBETI(LiN(SO$_2$CF$_2$CF$_3$)$_2$) ([Li]/[O]=0.06) as the ionically conductive binder were used in the positive electrode sheet. The positive electrode materials in a weight ratio of (mixture of $LiCoO_2$ and $Li_3PO_4$)/(conducting material)/(binder)=82/5/13 were introduced into acetonitrile and stirred by a homogenizer, after which an automatic applicator/doctor blade was used to apply the mixture to an aluminum collector. After the acetonitrile was dried, the electrode was pressure bonded in a press, and the resulting product was used. The positive electrode sheet thus fabricated was vacuum-dried overnight or longer at 80° C., and then continually stored in a glove box in an argon atmosphere.

During battery formation, the positive electrode sheet, the SPE sheet, and the Li negative electrode were each cut out by a punch to a prescribed radius, bonded together in the glove box in the argon atmosphere, and then sealed in a 2032-type coin battery to create a battery.

[Experimental Results]

Figure 11:
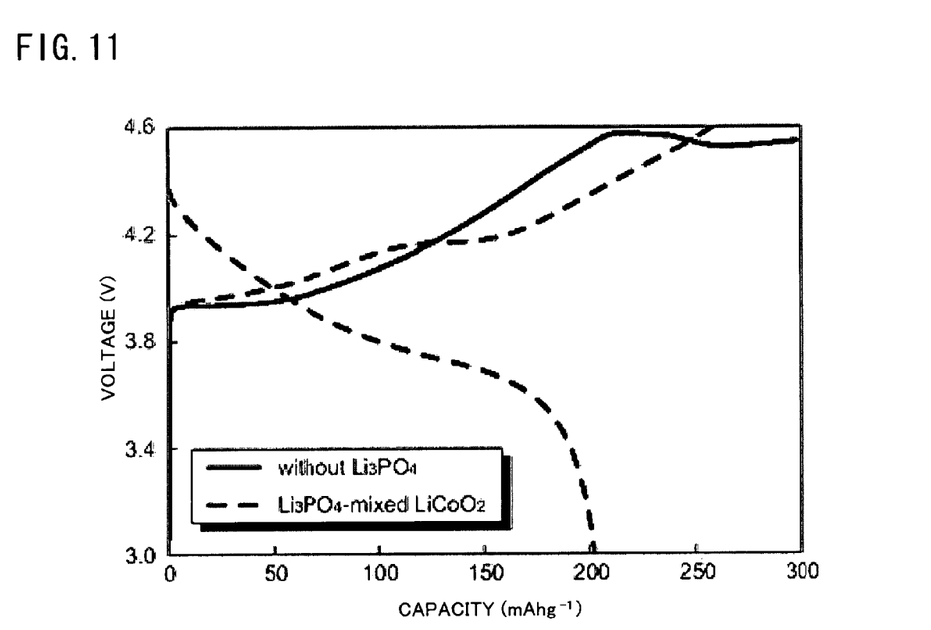
FIG. 11 shows the characteristics of the first charge and discharge of a solid polymer electrolyte battery that is created using a positive electrode sheet in which a positive electrode active material, an inorganic solid electrolyte, a conducting material, a binder, and a solvent are simultaneously mixed to create an electrode, and an organic electrolyte battery that is created using a positive electrode sheet manufactured without including the inorganic solid electrolyte.

Charge-discharge testing of the $LiCoO_2:Li_3PO_4=100:5$ battery was performed at 3.0 to 4.6 V, a current density of 0.05 $mAcm^{-2}$, and a temperature of 60° C. FIG. 11 shows the charge/discharge curve during the initial charge/discharge cycle. The battery in which $Li_3PO_4$ was mixed (Working Example c-1, $Li_3PO_4$-mixed $LiCoO_2$) had a discharge capacity of approximately 200 $mAhg^{-1}$ as a result of charging to 4.6 V and performing a corresponding reversible discharge.

The battery in which $Li_3PO_4$ was not mixed (Comparative Example c-1-1, without $Li_3PO_4$) could not be charged to 4.6 V, and the corresponding discharge test could not be performed.

Figure 12:
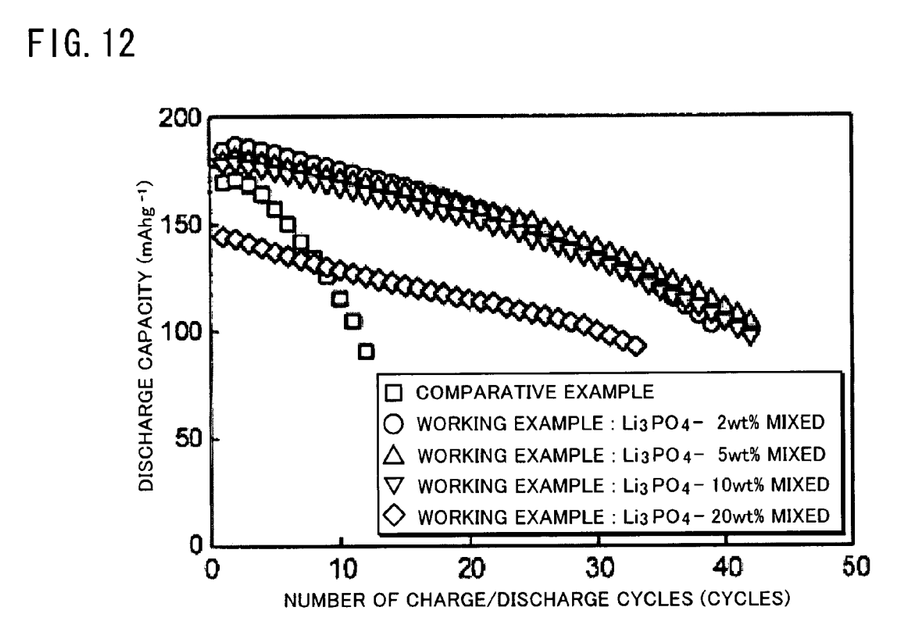
FIG. 12 shows the charge/discharge cycle characteristics of a solid polymer electrolyte battery that is created using a positive electrode sheet in which a positive electrode active material, an inorganic solid electrolyte, a conducting material, a binder, and a solvent are simultaneously mixed to create an electrode, and an organic electrolyte battery that is created using a positive electrode sheet manufactured without including the inorganic solid electrolyte.

FIG. 12 shows the charge-discharge cycle characteristics when the weight ratio of $LiCoO_2:Li_3PO_4$ was varied. The battery at this time was operated at 3.0 to 4.4 V, a current density of 0.05 $mAcm^{-2}$, and a temperature of 60° C. The batteries (Working Example C-1-2) at all mixture ratios had improved cycle characteristics in comparison to the battery (Comparative Example C-1-2) in which $Li_3PO_4$ was not mixed.

[Experiment c-2] (Creation of a Positive Electrode Material that Uses a Positive Electrode Active Material Having Surface State (c) Described Above (Part 2))

A pre-mixture of $LiNi_{0.5}Mn_{1.5}O_4$ and $Li_3PO_4$ in a weight ratio of 100:5, 100:10, 100:20, 100:30, or 100:40 was prepared in an agate mortar, and the mixture was provided for fabrication of a positive electrode sheet. The mixture of $LiNi_{0.5}Mn_{1.5}O_4$ and $Li_3PO_4$, acetylene black as the conducting material, and $P(EO/MEEGE)-LiBETI(LiN(SO_2CF_2CF_3)_2)$ ([Li]/[O]=0.06) as the ionically conductive binder were used in the positive electrode sheet. The positive electrode materials in a weight ratio of (mixture of $LiNi_{0.5}Mn_{1.5}O_4$ and $Li_3PO_4$)/(conducting material)/(binder)=82/5/13 were introduced into acetonitrile and stirred by a homogenizer, after which an automatic applicator/doctor blade was used to apply the mixture to an aluminum collector. After the acetonitrile was dried, the electrode was pressure bonded in a press, and the resulting product was used. The positive electrode sheet thus fabricated was vacuum-dried overnight or longer at 80 degrees, and then continually stored in a glove box in an argon atmosphere.

During battery formation, the positive electrode sheet, the SPE sheet, and the Li negative electrode were each cut out by a punch to a prescribed radius, bonded together in the glove box in the argon atmosphere, and then sealed in a 2032-type coin battery to create a battery.

[Experimental Results]

Figure 13:
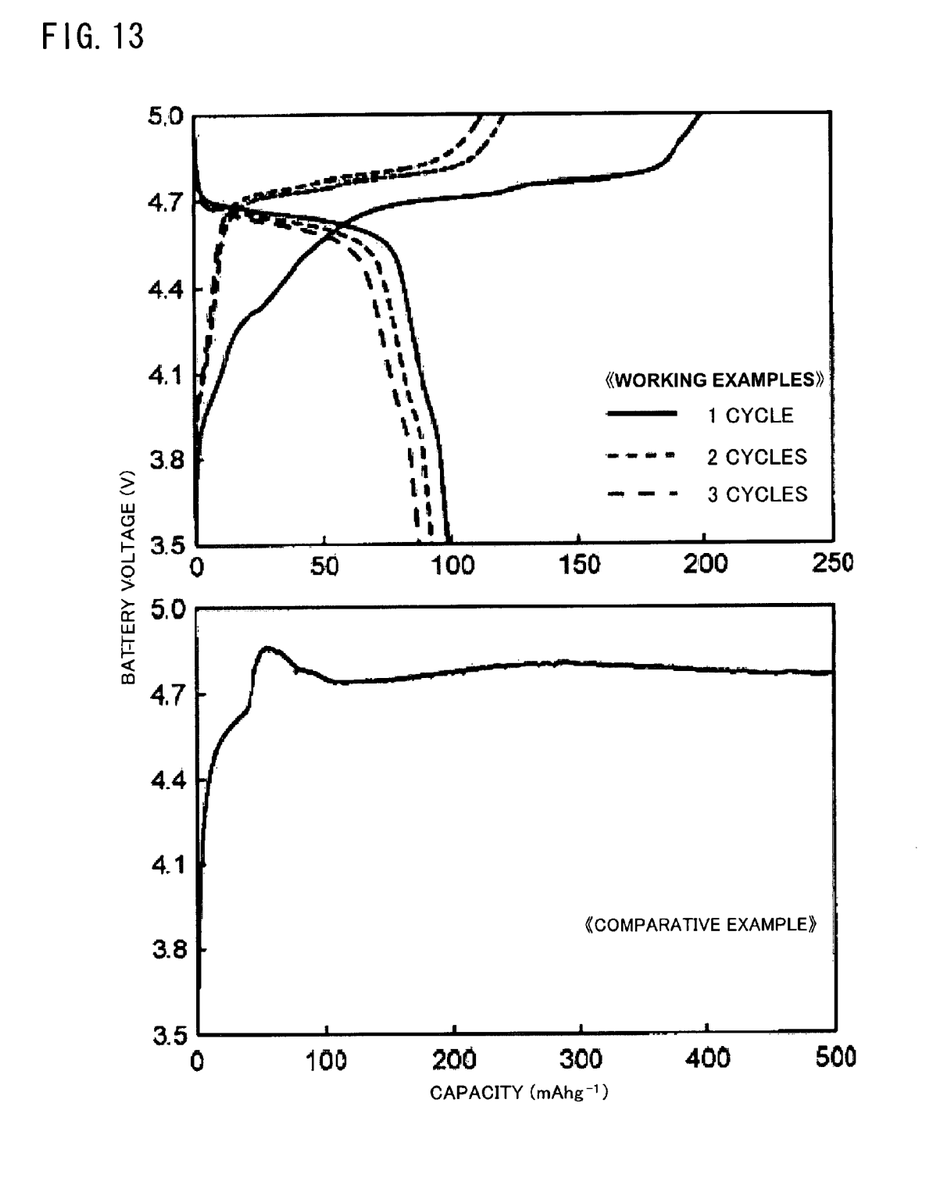
FIG. 13 shows the cycle characteristics of a solid polymer electrolyte battery that is created using a positive electrode sheet in which a positive electrode active material (LiNi$_{0.5}$Mn$_{1.5}$O$_4$) and an inorganic solid electrolyte (Li$_3$PO$_4$) are mixed in an agate mortar, and a solvent are then simultaneously mixed to create an electrode, as well as an organic electrolyte battery that is created using a positive electrode sheet manufactured without including the inorganic solid electrolyte.

Charge-discharge testing of the $LiNi_{0.5}Mn_{1.5}O_4:Li_3PO_4=100:20$ battery was performed at 3.5 to 5.0 V, a current density of 0.015 $mAcm^{-2}$, and a temperature of 60° C. FIG. 13 shows the charge/discharge curve during the initial charge/discharge cycle. The battery in which $Li_3PO_4$ was blended (Working Example c-2-1, $Li_3PO_4$-mixed $LiNi_{0.5}Mn_{1.5}O_4$) had a discharge capacity, including the weight of the $Li_3PO_4$, of approximately 100 $mAhg^{-1}$ as a result of charging to 5.0 V and performing a corresponding reversible discharge, and a satisfactory discharge capacity was obtained over the course of three cycles.

The battery in which $Li_3PO_4$ was not mixed (Comparative Example c-2-1, without $Li_3PO_4$) could not be charged to 5.0 V, and the corresponding discharge test could not be performed.

Figure 14:
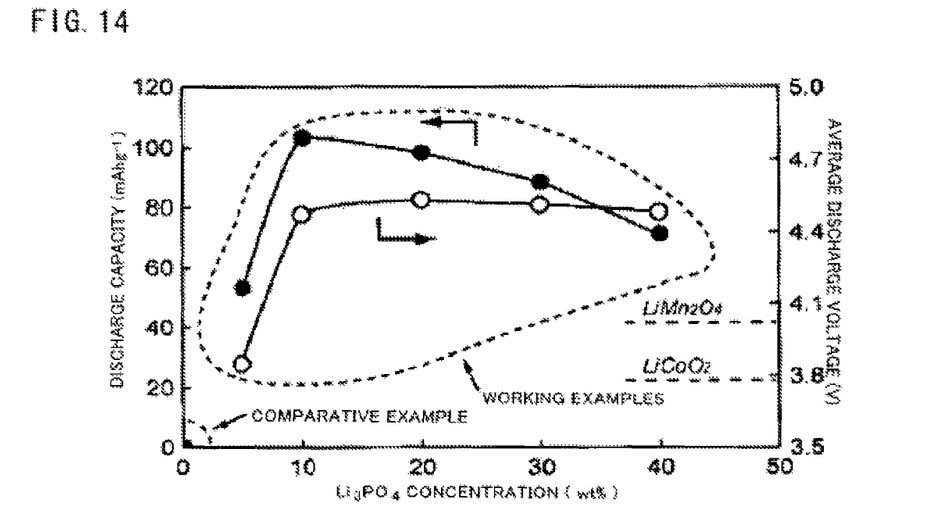
FIG. 14 shows the initial discharge capacity and the change in discharge plateau voltage when the weight quantity of the mixed inorganic solid electrolyte is varied in a solid polymer electrolyte battery that is created using a positive electrode sheet in which a positive electrode active material (LiNi$_{0.5}$Mn$_{1.5}$O$_4$) and an inorganic solid electrolyte (Li$_3$PO$_4$) are mixed in an agate mortar, and a conducting material, a binder, and a solvent are then simultaneously mixed to create an electrode, as well as an organic electrolyte battery that is created using a positive electrode sheet manufactured without including the inorganic solid electrolyte.

FIG. 14 shows the characteristics of the initial discharge capacity when the weight ratio of $LiNi_{0.5}Mn_{1.5}O_4:Li_3PO_4$ was varied. The battery at this time was operated at 3.5 to 5.0 V, a current density of 0.015 $mAcm^{-2}$, and a temperature of 60° C. In the case of this material, a high discharge capacity was obtained in batteries in which the amount of $Li_3PO_4$ was increased by 10% or more. It was learned that the optimum ratio of added $Li_3PO_4$ was about 10% when the weight of added $Li_3PO_4$ was considered (Working Example c-2-2). The discharge capacity decreased somewhat in the battery in which the amount of $Li_3PO_4$ was increased by 5%, and this added quantity was apparently inadequate. No discharge capacity was obtained in the battery to which $Li_3PO_4$ was not added (Comparative Example c-2-2).

In the solid polymer electrolyte battery and method for manufacturing the positive electrode sheet used in the organic electrolyte battery according to the present invention described above, even when particles of a positive electrode active material are used in the positive electrode, oxidative decomposition of the solid polymer electrolyte is suppressed by an ionically or electronically conductive attachment that is coated or attached to all or a portion of the surfaces of the positive electrode active material particles that act as an oxidizing agent during charging, and desorption of oxygen from the positive electrode active material particles is suppressed.

The present invention therefore provides a solid polymer electrolyte battery having satisfactory cycle characteristics in which it is possible to obtain high energy density and maintain high voltage for a long time during discharge while preventing the solid polymer electrolyte from degrading.

Since a solid polymer electrolyte is a type of material that is highly safe and can be easily scaled up in terms of areas and dimensions, the scale and capacity of a high-voltage all-solid secondary battery can be increased.

The embodiment described above is an example of a preferred embodiment of the present invention, but does not limit the present invention, and it is apparent that various modifications thereof are possible within the range and scope of the present invention. The electrolyte was a solid polymer solid electrolyte, and the secondary battery was a composite all-solid secondary battery in the description given above, but the may also be a gel-form electrolyte, or the like.

INDUSTRIAL APPLICABILITY

The present invention as described above provides a solid polymer electrolyte battery having high energy density and excellent cycle characteristics.

A polymer lithium battery was used as the example of a secondary battery described above, but it is apparent that the present invention can be applied to a battery other than a polymer lithium battery. In other words, the present invention can also be applied in a polymer sodium battery, for example.

The invention claimed is:

1. A solid polymer electrolyte battery in which a solid polymer electrolyte is interposed between a positive electrode material and a negative electrode material, wherein positive electrode active material particles that constitute a positive electrode have surfaces at least partially coated by an attachment that has ionic conductance and electronic conductance and is not oxidized even when supplied with oxygen from a positive electrode active material, and at least part of the surface of the active material particles is in a state in which there is no direct contact with the solid polymer electrolyte,
wherein said attachment consists only of:
microparticles of an inorganic solid electrolyte comprising lithium, phosphorous and oxygen; and
microparticles of a conducting material that has electronic conductance,
wherein the microparticles of the inorganic solid electrolyte have a grain size that is about ⅓ or less of the grain size of the positive electrode active material particles,
so as to suppress oxidative decomposition of the solid polymer electrolyte.

2. The solid polymer electrolyte battery according to claim 1, wherein said attachment comprises microparticles of an inorganic substance that has ionic conductance and electronic conductance.

3. The solid polymer electrolyte battery according to claim 1, wherein said solid polymer electrolyte battery is a polymer lithium secondary battery; and
said positive electrode active material particles that constitute a positive electrode have surfaces that comprise lithium ions and are at least partially coated by an attachment that has lithium ionic conductance and electronic conductance and is not oxidized even when supplied with oxygen from the positive electrode active material.

4. The solid polymer electrolyte battery according to claim 3, wherein said attachment comprises microparticles of an inorganic solid electrolyte that has lithium ionic conductance, and microparticles of a conducting material that has electronic conductance; and
said microparticles of an inorganic solid electrolyte are composed of any of lithium-containing phosphates, silicates, and aluminates or a mixture of the same.

5. The solid polymer electrolyte battery according to claim 4, wherein any of $Li_3PO_4$, $Li_{3+x}A_xP_{1-x}O_4$ (A=Si, Ge, Ti; $0<x<0.6$), $Li_{1+x}Al_xA_{2-x}(PO_4)_3$ (A=Ti, Ge; $0<x<0.5$), LiPON, and $LiMPO_4$ (M=Mn, Fe, Co, Ni), or a mixture of the compounds above is used in said microparticles of an inorganic solid electrolyte; and
any of acetylene black, ketjen black, carbon nanotubes, and other electronically conductive carbon materials; metal microparticles, metal fibers, and other metal materials; and electronically conductive ceramic materials, or a mixture of the materials above is used in said microparticles of a conducting material.

6. The solid polymer electrolyte battery according to claim 1, wherein a weight percent concentration of an inorganic solid electrolyte that is mixed with respect to said positive electrode active material is 0.1% to 50%; and
a weight percent concentration of a conducting material that is mixed with respect to said positive electrode active material is 0.05% to 10%.

7. The solid polymer electrolyte battery according to claim 2,
wherein a weight percent concentration of an inorganic solid electrolyte that is mixed with respect to said positive electrode active material is 0.1% to 50%; and
a weight percent concentration of a conducting material that is mixed with respect to said positive electrode active material is 0.05% to 10%.

8. The solid polymer electrolyte battery according to claim 3,
wherein a weight percent concentration of an inorganic solid electrolyte that is mixed with respect to said positive electrode active material is 0.1% to 50%; and
a weight percent concentration of a conducting material that is mixed with respect to said positive electrode active material is 0.05% to 10%.

9. The solid polymer electrolyte battery according to claim 4,
wherein a weight percent concentration of an inorganic solid electrolyte that is mixed with respect to said positive electrode active material is 0.1% to 50%; and
a weight percent concentration of a conducting material that is mixed with respect to said positive electrode active material is 0.05% to 10%.

10. The solid polymer electrolyte battery according to claim 5,
wherein a weight percent concentration of an inorganic solid electrolyte that is mixed with respect to said positive electrode active material is 0.1% to 50%; and
a weight percent concentration of a conducting material that is mixed with respect to said positive electrode active material is 0.05% to 10%.

11. A method for manufacturing a positive electrode sheet used in a solid polymer electrolyte battery in which a solid polymer electrolyte is interposed between a positive electrode material and a negative electrode material; said method for manufacturing a positive electrode sheet used in a solid polymer electrolyte battery, comprising:
forming a layer that has anti-oxidation properties, ionic conductance, and electronic conductance on all or a portion of a surface of active material particles by mixing and stirring particles consisting only of particles of an ionically conductive inorganic solid electrolyte and particles of an electronically conductive conducting material into the active material particles that constitute a positive electrode;
kneading a resulting mixture with a solvent and a solid polymer electrolyte that doubles as a binder;
applying the resulting mixture to a positive electrode collector; and
pressure-molding a resulting assembly, whereby a condition is achieved in which at least part of the surface of the active material particles is not in direct contact with the solid polymer electrolyte,
so as to suppress oxidative decomposition of the solid polymer electrolyte.

12. A method for manufacturing a positive electrode sheet used in a solid polymer electrolyte battery in which a solid polymer electrolyte is interposed between a positive electrode material and a negative electrode material; said method for manufacturing a positive electrode sheet used in a solid polymer electrolyte battery, comprising:
attaching one or both types of particles selected only from particles of an ionically conductive inorganic solid electrolyte and particles of an electronically conductive conducting material to all or a portion of surfaces of active material particles by mixing and stirring one or both types of particles selected from particles of an ionically conductive inorganic solid electrolyte and particles of an electronically conductive conducting material, at least one or both types of particles having anti-oxidation properties, into the active material particles that constitute a positive electrode, wherein said inorganic solid electrolyte comprises lithium, phosphorous and oxygen;
kneading a resulting mixture with a solvent, a solid polymer electrolyte that doubles as a binder, and one or both types of particles selected from particles of an ionically conductive inorganic solid electrolyte and particles of an electronically conductive conducting material;

applying the resulting mixture to a positive electrode collector; and pressure-molding a resulting assembly, whereby a condition is achieved in which at least part of the surface of the active material particles is not in direct contact with the solid polymer electrolyte, so as to suppress oxidative decomposition of the solid polymer electrolyte.

* * * * *